(12) United States Patent
Moh et al.

(10) Patent No.: US 9,396,870 B2
(45) Date of Patent: Jul. 19, 2016

(54) WIRELESS POWER TRANSMISSION DEVICES, WIRELESS POWER RECEPTION DEVICES, WIRELESS POWER TRANSMISSION SYSTEMS, AND WIRELESS POWER TRANSMISSION METHODS

(71) Applicants: Kyung-Goo Moh, Yongin-si (KR); Sung-Woo Moon, Seongnam-si (KR); Pyung-Woo Yeon, Seoul (KR)

(72) Inventors: Kyung-Goo Moh, Yongin-si (KR); Sung-Woo Moon, Seongnam-si (KR); Pyung-Woo Yeon, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 432 days.

(21) Appl. No.: 14/071,956

(22) Filed: Nov. 5, 2013

(65) Prior Publication Data

US 2014/0167520 A1    Jun. 19, 2014

(30) Foreign Application Priority Data

Dec. 14, 2012    (KR) .................... 10-2012-0146566

(51) Int. Cl.
| | | |
|---|---|---|
| *H01F 38/14* | (2006.01) | |
| *H01F 27/42* | (2006.01) | |
| *H01F 37/00* | (2006.01) | |
| *H04B 5/00* | (2006.01) | |

(52) U.S. Cl.
CPC .............. *H01F 38/14* (2013.01); *H04B 5/0037* (2013.01); *H04B 5/0075* (2013.01)

(58) Field of Classification Search
CPC ..... H01F 38/14; H04B 5/0037; H04B 5/0075
USPC ........................................................ 307/104
See application file for complete search history.

(56) References Cited

U.S. PATENT DOCUMENTS

| | | |
|---|---|---|
| 8,084,889 B2 | 12/2011 | Joannopoulos et al. |
| 8,097,983 B2 | 1/2012 | Karalis et al. |
| 2011/0140537 A1 | 6/2011 | Takei |
| 2011/0140671 A1 | 6/2011 | Kim et al. |
| 2011/0278945 A1 | 11/2011 | Wheatley, III et al. |
| 2011/0309689 A1 | 12/2011 | Kamata |
| 2012/0112554 A1 | 5/2012 | Kim et al. |

FOREIGN PATENT DOCUMENTS

| | | |
|---|---|---|
| JP | 2011-050140 A | 3/2011 |
| JP | 2012-060850 A | 3/2012 |
| KR | 10-2011-0135541 A | 12/2011 |
| KR | 10-2012-0047027 A | 5/2012 |

*Primary Examiner* — Hal Kaplan
(74) *Attorney, Agent, or Firm* — Harness, Dickey & Pierce P.L.C.

(57) ABSTRACT

A wireless power transmission device may comprise a source coil; and/or a resonance coil inductively coupled to the source coil. The source coil may transmit power outside of the wireless power transmission device in an electromagnetic induction type during a first interval. The source coil may transmit the power to the resonance coil in the electromagnetic induction type and the resonance coil may transmit the power received from the source coil to the outside of the wireless power transmission device in a magnetic resonance type during a second interval that is different from the first interval.

32 Claims, 14 Drawing Sheets

WIRELESS POWER TRANSMISSION DEVICES, WIRELESS POWER RECEPTION DEVICES, WIRELESS POWER TRANSMISSION SYSTEMS, AND WIRELESS POWER TRANSMISSION METHODS

CROSS-REFERENCE TO RELATED APPLICATION(S)

This application claims priority from Korean Patent Application No. 10-2012-0146566, filed on Dec. 14, 2012, in the Korean Intellectual Property Office (KIPO), the entire contents of which are incorporated herein by reference.

BACKGROUND

1. Field

Some example embodiments may relate to wireless power transmission devices, wireless power reception devices, wireless power transmission systems, and/or wireless power transmission methods.

2. Description of Related Art

A wireless power transmission type is classified into an electromagnetic induction type and a magnetic resonance type. The electromagnetic induction type uses induction of an electromotive force in a load-side coil by means of magnetic flux generated in a source-side coil, and the magnetic resonance type uses resonance of a magnetic field between a transmission resonance coil and a reception resonance coil.

SUMMARY

Some example embodiments may provide wireless power transmission devices that transmit power selectively using electromagnetic induction types and/or magnetic resonance types.

Some example embodiments may provide wireless power reception devices that receive power selectively using electromagnetic induction types and/or magnetic resonance types.

Some example embodiments may provide wireless power transmission systems that transmit and/or receive power selectively using electromagnetic induction types and/or magnetic resonance types.

Some example embodiments may provide wireless power transmission methods that transmit power selectively using electromagnetic induction types and/or magnetic resonance types.

In some example embodiments, a wireless power transmission device may comprise a source coil; and/or a resonance coil inductively coupled to the source coil. The source coil may transmit power outside of the wireless power transmission device in an electromagnetic induction type during a first interval. The source coil may transmit the power to the resonance coil in the electromagnetic induction type and the resonance coil transmits the power received from the source coil to the outside of the wireless power transmission device in a magnetic resonance type during a second interval that is different from the first interval.

In some example embodiments, the resonance coil may be short-circuited during the first interval, and/or the resonance coil may not be short-circuited during the second interval that is different from the first interval.

In some example embodiments, the resonance coil may be open-circuited during a first interval, and/or the resonance coil may not be open-circuited during the second interval that is different from the first interval.

In some example embodiments, a wireless power transmission device may comprise a source coil transmitting power in an electromagnetic induction type; a resonance coil inductively coupled to the source coil and transmitting the power in a magnetic resonance type; and/or a switch connected in parallel with the resonance coil. The switch may be in an ON state and/or the resonance coil may not receive the power from the source coil during a first interval. The switch may be in an OFF state and/or the resonance coil may receive the power from the source coil during a second interval that is different from the first interval.

In some example embodiments, the source coil may transmit the power outside of the wireless power transmission device in the electromagnetic induction type during the first interval, and/or the resonance coil may transmit the power received from the source coil to the outside of the wireless power transmission device in the magnetic resonance type during the second interval that is different from the first interval.

In some example embodiments, the resonance coil may be short-circuited during the first interval, and/or the resonance coil may not be short-circuited during the second interval that is different from the first interval.

In some example embodiments, a wireless power transmission device may comprise a source coil transmitting power in an electromagnetic induction type; a resonance coil inductively coupled to the source coil to transmit the power in a magnetic resonance type; and/or a switch connected in series with the resonance coil. The switch may be in an OFF state and/or the resonance coil may not receive the power from the source coil during a first interval. The switch may be in an ON state and/or the resonance coil may receive the power from the source coil during a second interval that is different from the first interval.

In some example embodiments, the source coil may transmit the power outside of the wireless power transmission device in the electromagnetic induction type during the first interval, and/or the resonance coil may transmit the power received from the source coil to the outside of the wireless power transmission device in the magnetic resonance type during the second interval that is different from the first interval.

In some example embodiments, the resonance coil may be open-circuited during the first interval, and/or the resonance coil may not be open-circuited during the second interval that is different from the first interval.

In some example embodiments, a wireless power reception device may comprise a load coil and/or a resonance coil inductively coupled to the load coil. The load coil may receive power from an outside of the wireless power transmission device in an electromagnetic induction type during a first interval. The resonance coil may receive the power from the outside of the wireless power transmission device in a magnetic resonance type and/or the load coil may receive the power from the resonance coil in the electromagnetic induction type during a second interval that is different from the first interval.

In some example embodiments, the resonance coil may be short-circuited during the first interval and/or the resonance coil may not be short-circuited during the second interval that is different from the first interval.

In some example embodiments, the resonance coil may be open-circuited during the first interval, and/or the resonance coil may not be open-circuited during the second interval that is different from the first interval.

In some example embodiments, a wireless power transmission system may comprise a wireless power transmission device transmitting power; and/or a wireless power reception device including a load coil to receive the power from the wireless power transmission device. The wireless power transmission device may include a source coil and/or a transmission resonance coil inductively coupled to the source coil. The source coil may transmit the power to the load coil in an electromagnetic induction type during a first interval. The source coil may transmit the power to the transmission resonance coil in the electromagnetic induction type and/or the transmission resonance coil may transmit the power received from the source coil to the load coil in a magnetic resonance type during a second interval that is different from the first interval.

In some example embodiments, a wireless power transmission method may comprise transmitting power to a wireless power reception device in an electromagnetic induction type using a source coil; and/or transmitting the power to the wireless power reception device in a magnetic resonance type using a transmission resonance coil inductively coupled to the source coil.

In some example embodiments, the transmitting the power in the electromagnetic induction type may include making the transmission resonance coil short-circuited. The transmitting the power in the magnetic resonance type may include making the transmission resonance coil not short-circuited.

In some example embodiments, the transmitting the power in the electromagnetic induction type may include making the transmission resonance coil open-circuited. The transmitting the power in the magnetic resonance type may include making the transmission resonance coil not open-circuited.

In some example embodiments, the transmitting the power in the electromagnetic induction type may comprise receiving a reception power value, which a load of the wireless power reception device receives, from the wireless power reception device.

In some example embodiments, the transmitting the power in the electromagnetic induction type may further comprise measuring a transmission power value that is transmitted to the wireless power reception device.

In some example embodiments, the transmitting the power in the electromagnetic induction type may further comprise switching a power transmission type to the magnetic resonance type if a power transfer efficiency according to the transmission power value and the reception power value is lower than a reference efficiency.

In some example embodiments, the transmitting the power in the magnetic resonance type may comprise changing a resonance frequency of the transmission resonance coil and a reception resonance coil according to a coupling coefficient of the transmission resonance coil and the reception resonance coil of the wireless power reception device.

In some example embodiments, the transmitting the power in the magnetic resonance type may further comprise tracking the change of the resonance frequency of the transmission resonance coil and the reception resonance coil.

In some example embodiments, the transmitting the power in the magnetic resonance type may further comprise switching a power transmission type to the electromagnetic induction type if a variation of the resonance frequency of the transmission resonance coil is larger than a reference variation.

In some example embodiments, the transmitting the power in the magnetic resonance type may comprise fixing a coupling coefficient of the source coil and the transmission resonance coil to a reference coupling coefficient on initial conditions.

In some example embodiments, the transmitting the power in the magnetic resonance type may further comprise receiving a reception power value, which a reference load of the wireless power reception device receives, from the wireless power reception device.

In some example embodiments, the transmitting the power in the magnetic resonance type may further comprise estimating a coupling coefficient of the transmission resonance coil and a reception resonance coil of the wireless power reception device according to the reception power value.

In some example embodiments, a wireless power system may comprise a wireless power transmission device; and/or a wireless power reception device. The wireless power transmission device may be configured to transmit power to the wireless power reception device in an electromagnetic induction type during a first interval. The wireless power transmission device may be further configured to transmit power to the wireless power reception device in a magnetic resonance type during a second interval that is different from the first interval.

In some example embodiments, the wireless power transmission device may comprise a source coil and/or a first resonance coil inductively coupled to the source coil.

In some example embodiments, the wireless power system may further comprise a first switch in parallel with the first resonance coil. The first switch may be configured to selectively short-circuit the first resonance coil.

In some example embodiments, the wireless power system may further comprise a second switch in series with the first resonance coil. The second switch may be configured to selectively open-circuit the first resonance coil.

In some example embodiments, the wireless power reception device may comprise a load coil and/or a second resonance coil inductively coupled to the load coil.

In some example embodiments, the wireless power system may further comprise a third switch in parallel with the second resonance coil. The third switch may be configured to selectively short-circuit the second resonance coil.

In some example embodiments, the wireless power system may further comprise a fourth switch in series with the second resonance coil. The fourth switch may be configured to selectively open-circuit the second resonance coil.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
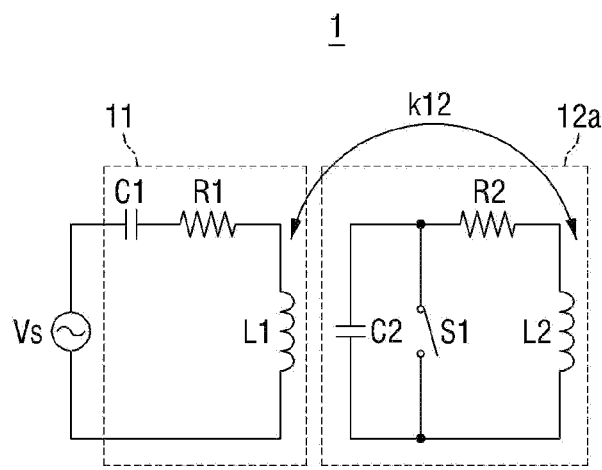
FIG. 1 is a circuit diagram schematically illustrating the configuration of a wireless power transmission device according to some example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a circuit diagram schematically illustrating the configuration of a wireless power transmission device according to some example embodiments.

Referring to FIG. 1, a wireless power transmission device 1 according to some example embodiments includes a source voltage Vs, a source coil unit 11, and a resonance coil unit 12a.

The source voltage Vs supplies alternating current (AC) power to the source coil unit 11.

The source coil unit 11 includes a source coil L1, a first resistance R1, and a first capacitance C1. The source coil L1 receives the power from the source voltage Vs, and transmits the power to an outside in an electromagnetic induction type. The first resistance R1 may be a parasitic resistance of the source coil L1, and the first capacitance C1 may be a parasitic capacitance of the source coil L1.

The resonance coil unit 12a includes a transmission resonance coil L2, a second resistance R2, and a second capacitance C2. The transmission resonance coil L2 transmits the power to the outside in the magnetic resonance type. The second resistance R2 may be a parasitic resistance of the transmission resonance coil L2, and the second capacitance C2 may be a parasitic capacitance of the transmission resonance coil L2.

The source coil L1 of the source coil unit 11 and the transmission resonance coil L2 of the resonance coil unit 12a are inductively coupled to each other. Here, the inductive coupling means that a plurality of coils are coupled through mutual inductance, at least a part of magnetic flux generated by current flowing through a first coil is linked to a second coil, and thus current is induced in the second coil. Accordingly, the source coil L1 may transmit the power to the transmission resonance coil L2 in the electromagnetic induction type. The reference numeral "k12" illustrated in FIG. 1 denotes a coupling coefficient of the source coil L1 and the transmission resonance coil L2.

A first switch S1 is connected in parallel with the transmission resonance coil L2 to make the transmission resonance coil L2 short-circuited. If the first switch S1 is in an ON state, the transmission resonance coil L2 is short-circuited, and if the first switch S1 is in an OFF state, the transmission resonance coil L2 is not short-circuited.

In FIG. 1, if the transmission resonance coil L2 is short-circuited and the second resistance R2 is sufficiently low, for example, if a frequency ω satisfies ωL>>R2, a phase difference between the current that flows through the transmission resonance coil L2 and the voltage across the transmission resonance coil L2 becomes about 90 degrees and the effective power becomes 0. In this case, the power is not transmitted form the source coil L1 to the transmission resonance coil L2.

Accordingly, in the wireless power transmission device 1 according to some example embodiments, the first switch S1 is in an ON state and the transmission resonance coil L2 is short-circuited at a first time. Thus, the transmission resonance coil L2 may not receive the power from the source coil L1, and the source coil L1 may transmit the power to the outside in the electromagnetic induction type. Further, the first switch S1 is in an OFF state and the transmission resonance coil L2 is not short-circuited at a second time that is different from the first time. Accordingly, the transmission resonance coil L2 may receive the power from the source coil L1, and the transmission resonance coil L2 may transmit the reception power to the outside in the magnetic resonance type.

Figure 2:
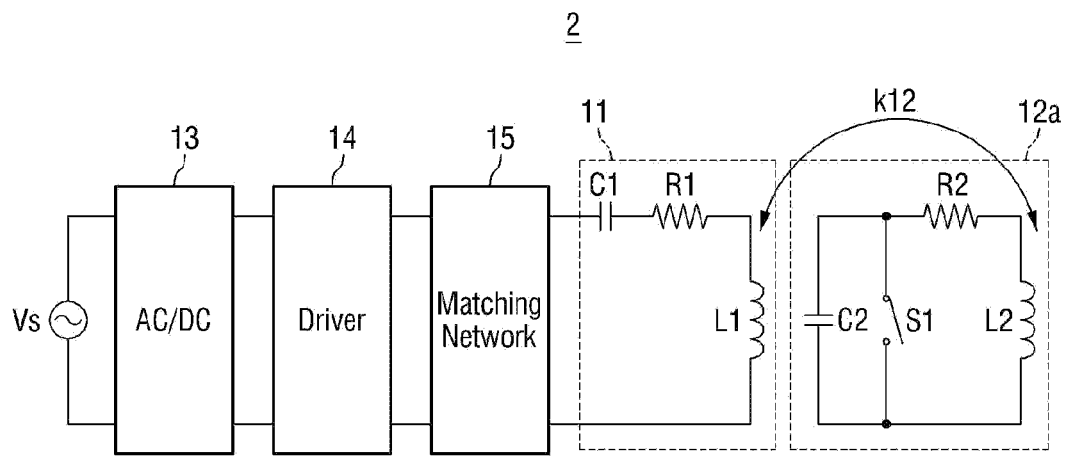
FIG. 2 is a circuit diagram schematically illustrating the configuration of a wireless power transmission device according to some example embodiments.

FIG. 2 is a circuit diagram schematically illustrating the configuration of a wireless power transmission device according to some example embodiments. For convenience in explanation, the detailed explanation will be made around a different point from that illustrated in FIG. 1.

Referring to FIG. 2, a wireless power transmission device 2 according to some example embodiments further includes an AC/DC converter 13, a driver 14, and a matching network 15.

The AC/DC converter 13 converts AC power that the source voltage Vs supplies into direct current (DC) power.

The driver 14 converts the DC power converted by the AC/DC converter 13 into a wireless power signal, controls the frequency, and supplies the wireless power signal to the source coil L1. The driver 14 may include an inverter, for example, a half-bridge circuit, but is not limited thereto. In accordance with a switching frequency of the half-bridge circuit, the frequency of the wireless power signal that is supplied to the source coil L1 may be controlled.

The matching network 15 is a network for matching impedance with the wireless power reception device that receives the power from the outside.

Figure 3:
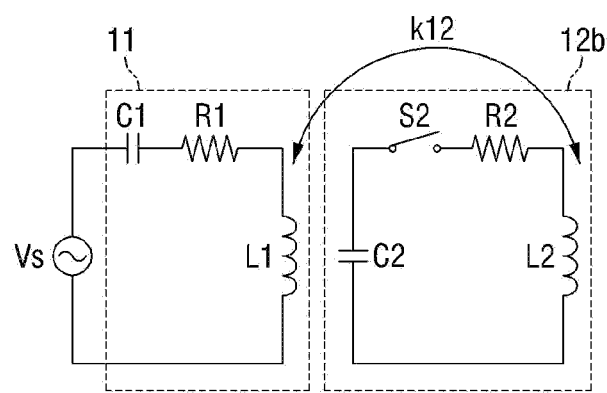
FIG. 3 is a circuit diagram schematically illustrating the configuration of a wireless power transmission device according to some example embodiments.

FIG. 3 is a circuit diagram schematically illustrating the configuration of a wireless power transmission device according to some example embodiments.

Referring to FIG. 3, a wireless power transmission device 3 according to some example embodiments includes a source voltage Vs, a source coil unit 11, and a resonance coil unit 12b.

The source voltage Vs supplies AC power to the source coil unit 11.

The source coil unit 11 includes a source coil L1, a first resistance R1, and a first capacitance C1. The source coil L1 receives the power from the source voltage Vs, and transmits the power to an outside in an electromagnetic induction type. The first resistance R1 may be a parasitic resistance of the source coil L1, and the first capacitance C1 may be a parasitic capacitance of the source coil L1.

The resonance coil unit 12b includes a transmission resonance coil L2, a second resistance R2, and a second capacitance C2. The transmission resonance coil L2 transmits the power to the outside in the magnetic resonance type. The second resistance R2 may be a parasitic resistance of the transmission resonance coil L2, and the second capacitance C2 may be a parasitic capacitance of the transmission resonance coil L2.

The source coil L1 of the source coil unit 11 and the transmission resonance coil L2 of the resonance coil unit 12b are inductively coupled to each other. Accordingly, the source coil L1 may transmit the power to the transmission resonance coil L2 in the electromagnetic induction type. The reference numeral "k12" illustrated in FIG. 3 denotes a coupling coefficient of the source coil L1 and the transmission resonance coil L2.

A second switch S2 is connected in series with the transmission resonance coil L2 to make the transmission resonance coil L2 open-circuited. If the second switch S2 is in an ON state, the transmission resonance coil L2 is not open-circuited, and if the second switch S2 is in an OFF state, the transmission resonance coil L2 is open-circuited.

In FIG. 3, if the transmission resonance coil L2 is open-circuited, the current that flows through the transmission resonance coil L2 becomes 0 and the effective power becomes 0. Accordingly, even in this case, the power is not transmitted from the source coil L1 to the transmission resonance coil L2. However, if the frequency is high, it is necessary to consider the point that the parasitic capacitance of the transmission resonance coil L2 becomes high.

Accordingly, in the wireless power transmission device 3 according to some example embodiments, the second switch S2 is in an OFF state and the transmission resonance coil L2 is open-circuited at a first time. Thus, the transmission resonance coil L2 may not receive the power from the source coil L1, and the source coil L1 may transmit the power to the outside in the electromagnetic induction type. Further, the second switch S2 is in an ON state and the transmission resonance coil L2 is not open-circuited at a second time that is different from the first time. Accordingly, the transmission resonance coil L2 may receive the power from the source coil L1, and the transmission resonance coil L2 may transmit the reception power to the outside in the magnetic resonance type.

Figure 4:
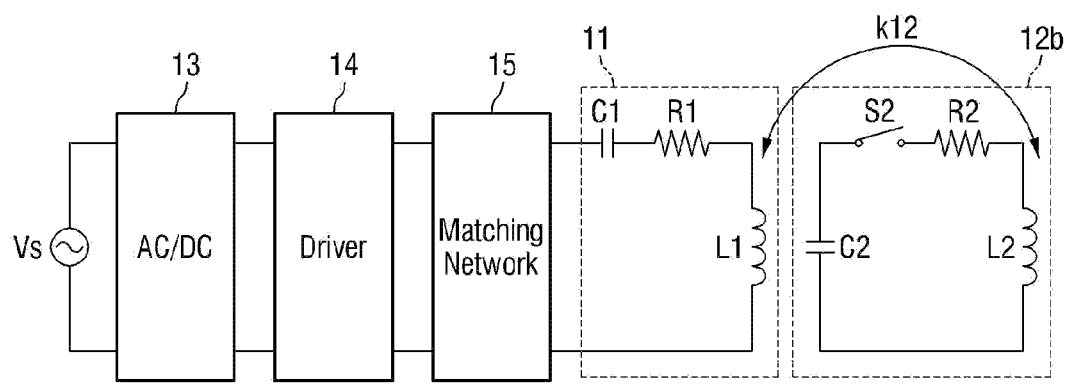
FIG. 4 is a circuit diagram schematically illustrating the configuration of a wireless power transmission device according to some example embodiments.

FIG. 4 is a circuit diagram schematically illustrating the configuration of a wireless power transmission device according to some example embodiments. For convenience in explanation, the detailed explanation will be made around a different point from that illustrated in FIG. 3.

Referring to FIG. 4, a wireless power transmission device 4 according to some example embodiments further includes an AC/DC converter 13, a driver 14, and a matching network 15.

The AC/DC converter 13 converts AC power that the source voltage Vs supplies into DC power.

The driver 14 converts the DC power converted by the AC/DC converter 13 into a wireless power signal, controls the frequency, and supplies the wireless power signal to the source coil L1. The driver 14 may include an inverter, for example, a half-bridge circuit, but is not limited thereto. In accordance with a switching frequency of the half-bridge circuit, the frequency of the wireless power signal that is supplied to the source coil L1 may be controlled.

The matching network 15 is a network for matching impedance with the wireless power reception device that receives the power from the outside.

Figure 5:
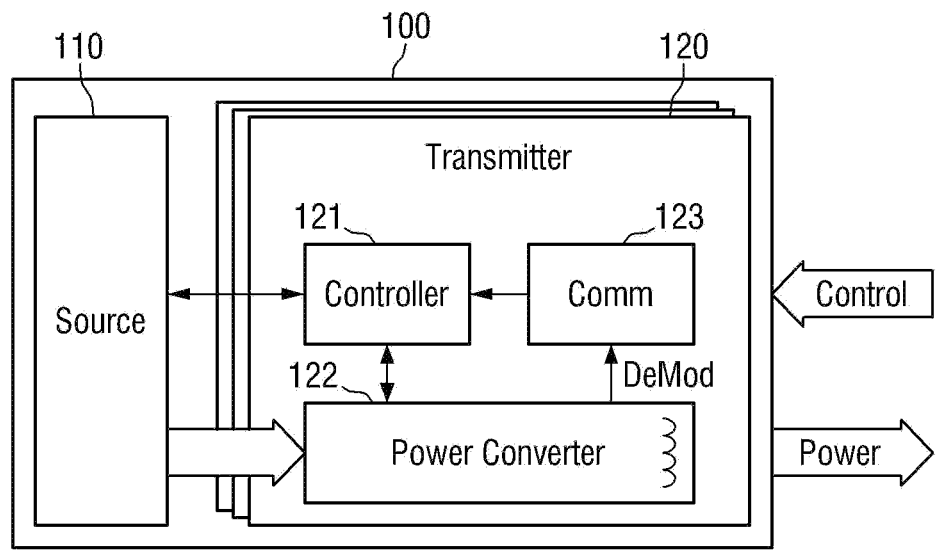
FIG. 5 is a block diagram schematically illustrating the control configuration of a wireless power transmission device according to some example embodiments.

FIG. 5 is a block diagram schematically illustrating the control configuration of a wireless power transmission device according to some example embodiments.

Referring to FIG. 5, a wireless power transmission device 100 according to some example embodiments includes a source 110 and a transmitter 120.

The source 110 includes a source voltage Vs and a supplied power measurement circuit (not illustrated). In the wireless power transmission devices 1 to 4 according to some example embodiments as illustrated in FIGS. 1 to 4, the source voltage Vs may be arranged on the source 110. The supplied power measurement circuit may measure a supplied power value that the source voltage Vs supplies to the source coil L1. The supplied power measurement circuit may transmit the measured supplied power value to a controller 121 of the transmitter 120 to be described later.

The wireless power transmission device 100 may include a plurality of transmitters 120. Although FIG. 5 illustrates three transmitters 120, example embodiments are not limited thereto.

The transmitter 120 includes the controller 121, a communicator (Comm) 123, and a power converter 122.

The power converter 122 converts the power that is supplied from the source 110 into a wireless power signal, and transmits the power to a wireless power reception device in the electromagnetic induction type or the magnetic resonance type. In the wireless power transmission devices 1 to 4 in FIGS. 1 to 4, the source coil unit 11 and the resonance coil units 12a and 12b may be arranged on the power converter 122.

The controller 121 receives control information from the communicator 123 to be described later, and controls an operation point of the power converter 122. Here, the operation point may include, for example, current that flows through the transmission resonance coil L2 and resonance frequencies of the transmission resonance coil L2 and a reception resonance coil. The controller 121 may control the power that is supplied by the source 110.

The communicator 123 receives the control information from the wireless power reception device. The communicator 123 may receive the control information through demodulation of a reflected load. The communicator 123 transmits the received control information to the controller 121. The control information may include, for example, a target power value that is required in the wireless power reception device, and a reception power value that is transferred to the load of the wireless power reception device. A method for receiving the control information from the wireless power reception device will be described with reference to FIG. 6.

Figure 6:
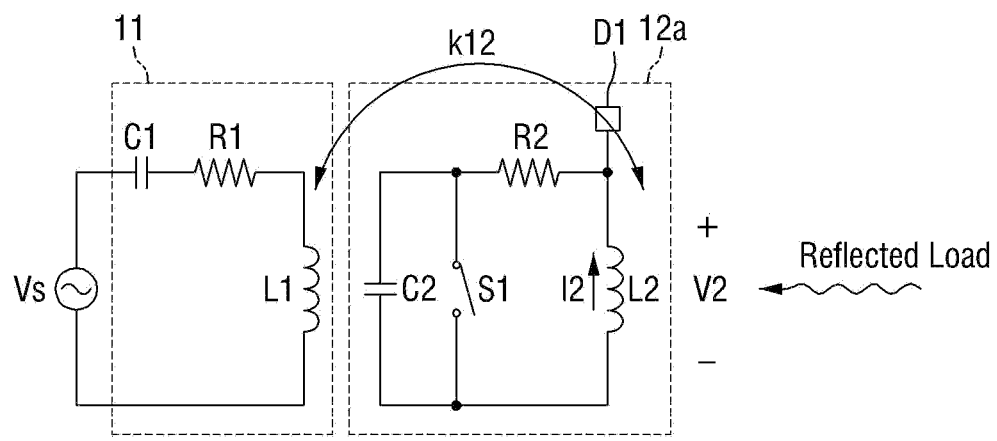
FIG. 6 is a diagram explaining that the wireless power transmission device of FIG. 5 receives control information.

FIG. 6 is a diagram explaining that the wireless power transmission device of FIG. 5 receives control information.

Referring to FIG. 6, a measurement sensor D1 may be installed on the transmission resonance coil L2 of the power converter 122. The measurement sensor D1 may measure the current I2 that flows through the transmission resonance coil L2 and/or the voltage V2 of the transmission resonance coil L2.

The communicator 123 may receive the control information through demodulation of the reflected load based on the current value and/or the voltage value measured by the measurement sensor D1. The wireless power reception device may modulate the reflected load through modulation of the load to be described later.

Figure 7:
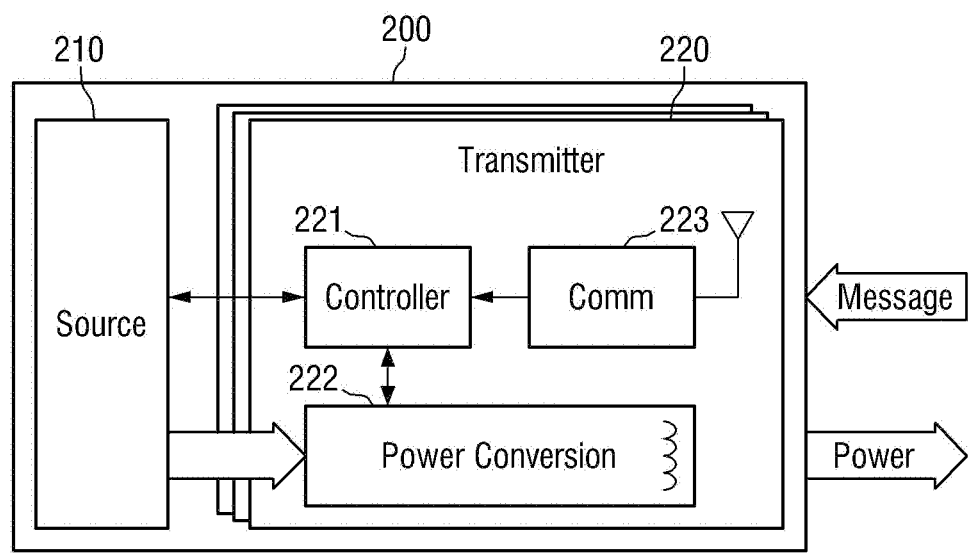
FIG. 7 is a block diagram schematically illustrating the control configuration of a wireless power transmission device according to some example embodiments.

FIG. 7 is a block diagram schematically illustrating the control configuration of a wireless power transmission device according to some example embodiments. For convenience in explanation, the detailed explanation will be made around the different point from that illustrated in FIG. 5.

Referring to FIG. 7, a wireless power transmission device 200 according to some example embodiments includes a source 210 and a transmitter 220.

The transmitter 220 includes a controller 221, a communicator (Comm) 223, and a power converter 222.

Referring to FIG. 7, in a wireless power transmission device 200 according to some example embodiments, the communicator 223 may form a communication network that is separate from the communicator of the wireless power reception device, and may transmit and/or receive various kinds of messages. The various kinds of messages may include, for example, a target power value that is required in the wireless power reception device, a reception power value that is transferred to the load of the wireless power reception device, and a transmission type of the wireless power transmission device. Unlike the wireless power transmission device illustrated in FIG. 5, the wireless power transmission device 200 according to some example embodiments does not use the demodulation of the reflected load.

Figure 8:
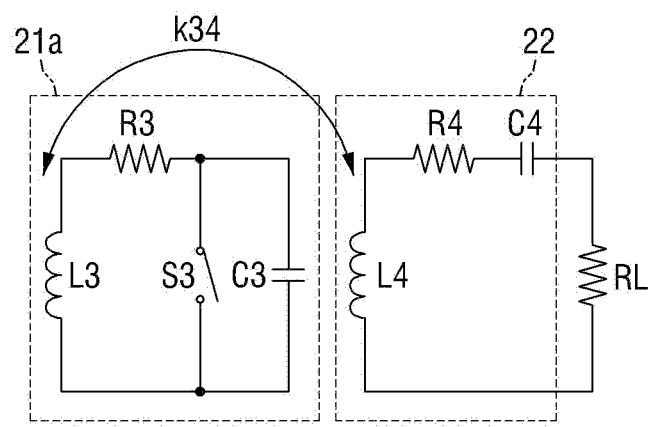
FIG. 8 is a circuit diagram schematically illustrating the configuration of a wireless power reception device according to some example embodiments.

FIG. 8 is a circuit diagram schematically illustrating the configuration of a wireless power reception device according to some example embodiments.

Referring to FIG. 8, a wireless power reception device 5 according to some example embodiments includes a resonance coil unit 21a, a load coil unit 22, and a load RL.

The resonance coil unit 21a includes a reception resonance coil L3, a third resistance R3, and a third capacitance C3. The reception resonance coil L3 receives power from an outside in a magnetic resonance type. The third resistance R3 may be a parasitic resistance of the reception resonance coil L3, and the third capacitance C3 may be a parasitic capacitance of the reception resonance coil L3.

The load coil unit 22 includes a load coil L4, a fourth resistance R4, and a fourth capacitance C4. The load coil L4 receives the power from the outside in the electromagnetic induction type, and supplies the reception power to the load RL. The fourth resistance R4 may be a parasitic resistance of the load coil L4, and the fourth capacitance C4 may be a parasitic capacitance of the load coil L4.

The load RL receives the power from the load coil L4.

The reception resonance coil L3 of the resonance coil unit 21a and the load coil L4 of the load coil unit 22 are inductively coupled to each other. Accordingly, the reception resonance coil L3 may transmit the power to the load coil L4 in the electromagnetic induction type. The reference numeral "k34" illustrated in FIG. 8 denotes a coupling coefficient of the reception resonance coil L3 and the load coil L4.

A third switch S3 is connected in parallel with the reception resonance coil L3 to make the reception resonance coil L3 short-circuited. If the third switch S3 is in an ON state, the reception resonance coil L3 is short-circuited, and if the third switch S3 is in an OFF state, the reception resonance coil L3 is not short-circuited.

In FIG. 8, if the reception resonance coil L3 is short-circuited, the effective power of the reception resonance coil L3 is close to 0 and, in this case, the reception resonance coil L3 does not receive the power from the outside, which is substantially the same as the case as described above with reference to FIG. 1.

Accordingly, in the wireless power reception device 5 according to some example embodiments, the third switch S3 is in an OFF state and the reception resonance coil L3 is short-circuited at the first time. Accordingly, the reception resonance coil L3 may not receive the power from the outside, and the load coil L4 may receive the power from the outside in the electromagnetic induction type. Further, the third switch S3 is in an OFF state, and the reception resonance coil L3 is not short-circuited at the second time that is different from the first time. Accordingly, the reception resonance coil L3 may receive the power from the outside in the magnetic resonance type, and the load coil L4 may receive the reception power from the reception resonance coil L3 in the electromagnetic induction type.

Figure 9:
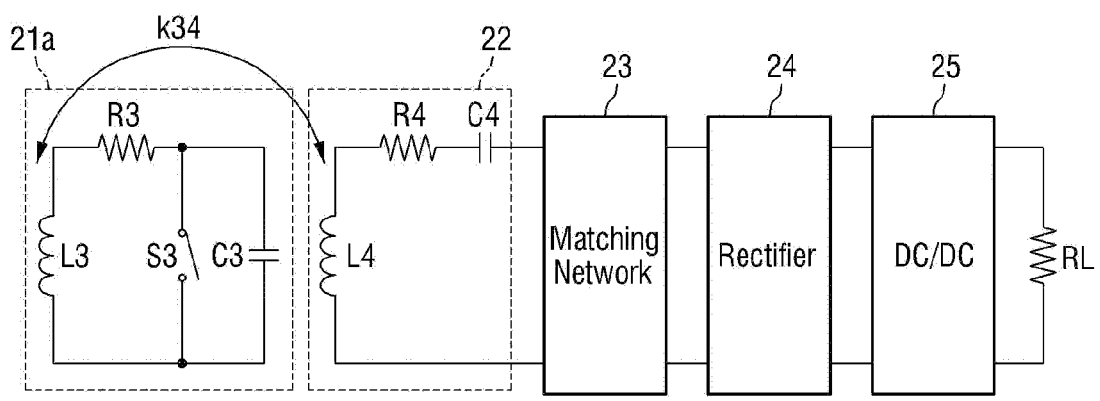
FIG. 9 is a circuit diagram schematically illustrating the configuration of a wireless power reception device according to some example embodiments.

FIG. 9 is a circuit diagram schematically illustrating the configuration of a wireless power reception device according to some example embodiments. For convenience in explanation, the detailed explanation will be made around a different point from that illustrated in FIG. 8.

Referring to FIG. 9, a wireless power reception device 6 according to some example embodiments further includes a matching network 23, a rectifier 24, and a DC/DC converter 25.

The matching network 23 is a network for matching impedance with the wireless power transmission device that transmits the power from the outside.

The rectifier 24 converts the AC power supplied from the load coil L4 into DC power. The rectifier 24 may include, for example, a full-bridge circuit, but is not limited thereto.

The DC/DC converter 25 controls the level of the DC power converted by the rectifier 24, and supplies the converted power to the load RL.

Figure 10:
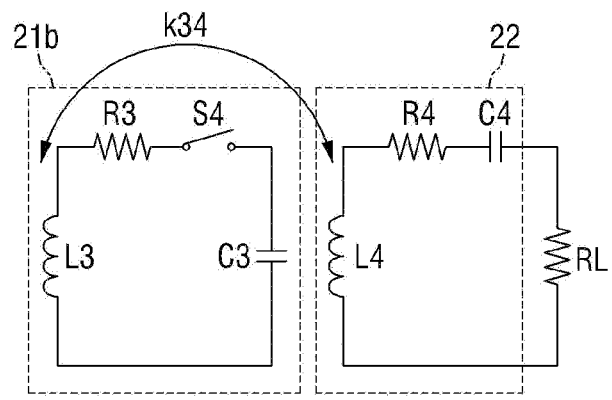
FIG. 10 is a circuit diagram schematically illustrating the configuration of a wireless power reception device according to some example embodiments.

FIG. 10 is a circuit diagram schematically illustrating the configuration of a wireless power reception device according to some example embodiments.

Referring to FIG. 10, a wireless power reception device 7 according to some example embodiments includes a resonance coil unit 21b, a load coil unit 22, and a load RL.

The resonance coil unit 21b includes a reception resonance coil L3, a third resistance R3, and a third capacitance C3. The reception resonance coil L3 receives the power from the outside in the magnetic resonance type. The third resistance R3 may be a parasitic resistance of the reception resonance coil L3, and the third capacitance C3 may be a parasitic capacitance of the reception resonance coil L3.

The load coil unit 22 includes a load coil L4, a fourth resistance R4, and a fourth capacitance C4. The load coil L4 receives the power from the outside in the electromagnetic induction type, and supplies the reception power to the load RL. The fourth resistance R4 may be a parasitic resistance of the load coil L4, and the fourth capacitance C4 may be a parasitic capacitance of the load coil L4.

The load RL receives the power from the load coil L4.

The reception resonance coil L3 of the resonance coil unit 21b and the load coil L4 of the load coil unit 22 are inductively coupled to each other. Accordingly, the reception resonance coil L3 may transmit the power to the load coil L4 in the electromagnetic induction type. The reference numeral "k34" illustrated in FIG. 8 denotes a coupling coefficient of the reception resonance coil L3 and the load coil L4.

A fourth switch S4 is connected in series with the reception resonance coil L3 to make the reception resonance coil L3 open-circuited. If the fourth switch S4 is in an ON state, the reception resonance coil L3 is not open-circuited, and if the fourth switch S4 is in an OFF state, the reception resonance coil L3 is open-circuited.

In FIG. 10, if the reception resonance coil L3 is open-circuited, the effective power of the reception resonance coil L3 is close to 0 and, in this case, the reception resonance coil L3 does not receive the power from the outside, which is substantially the same as the case as described above with reference to FIG. 3.

Accordingly, in the wireless power reception device 7 according to some example embodiments, the fourth switch S4 is in an OFF state and the reception resonance coil L3 is open-circuited at the first time. Accordingly, the reception resonance coil L3 may not receive the power from the outside, and the load coil L4 may receive the power from the outside in the electromagnetic induction type. Further, the fourth switch S4 is in an ON state, and the reception resonance coil L3 is not open-circuited at the second time that is different from the first time. Accordingly, the reception resonance coil L3 may receive the power from the outside in the magnetic resonance type, and the load coil L4 may receive the power received from the reception resonance coil L3 in the electromagnetic induction type.

Figure 11:
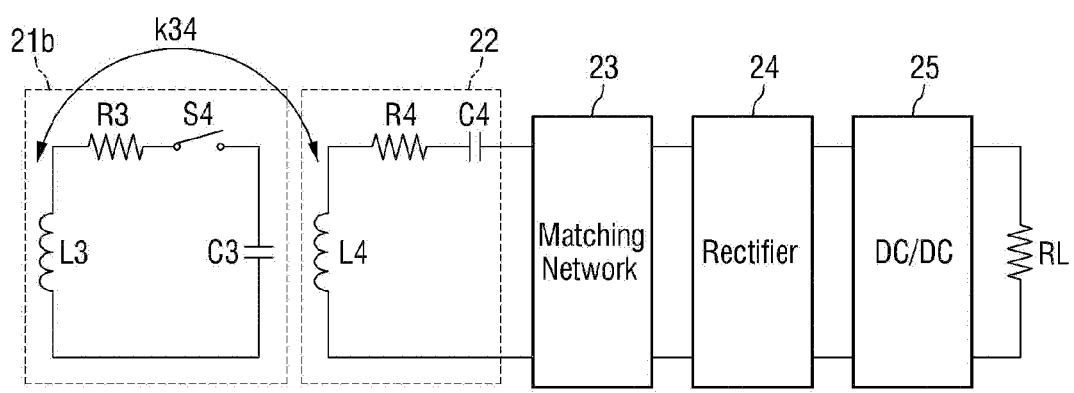
FIG. 11 is a circuit diagram schematically illustrating the configuration of a wireless power reception device according to some example embodiments.

FIG. 11 is a circuit diagram schematically illustrating the configuration of a wireless power reception device according to some example embodiments. For convenience in explanation, the detailed explanation will be made around a different point from that illustrated in FIG. 10.

Referring to FIG. 11, a wireless power reception device 8 according to some example embodiments further includes a matching network 23, a rectifier 24, and a DC/DC converter 25.

The matching network 23 is a network for matching impedance with the wireless power transmission device that transmits the power from the outside.

The rectifier 24 converts the AC power supplied from the load coil L4 into DC power. The rectifier 24 may include, for example, a full-bridge circuit, but is not limited thereto.

The DC/DC converter 25 controls the level of the DC power converted by the rectifier 24, and supplies the converted power to the load RL.

Figure 12:
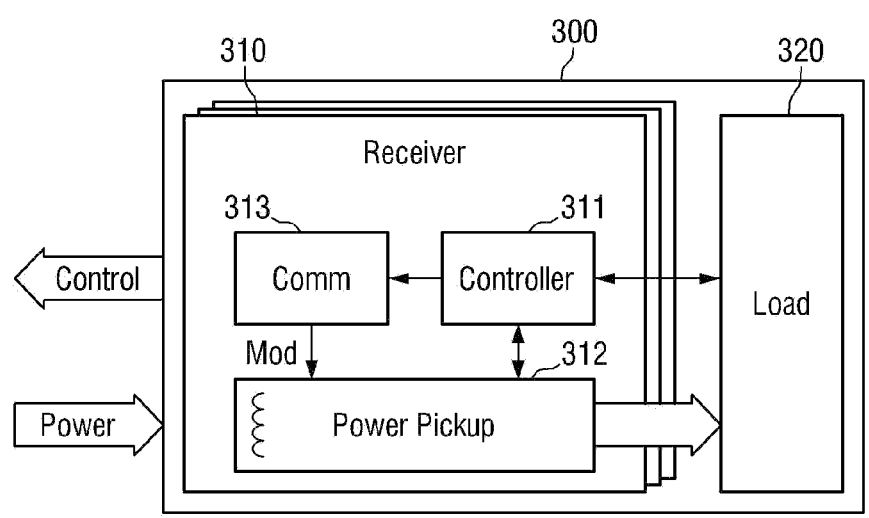
FIG. 12 is a block diagram schematically illustrating the control configuration of a wireless power reception device according to some example embodiments.

FIG. 12 is a circuit diagram schematically illustrating the configuration of a wireless power reception device according to some example embodiments.

Referring to FIG. 12, a wireless power reception device 300 according to some example embodiments includes a receiver 310 and a load 320.

The receiver 310 includes a controller 311, a communicator (Comm) 313, and a power pickup 312.

The power pickup 312 receives the wireless power signal from the wireless power transmission device in the electromagnetic induction type or the magnetic resonance type, converts the wireless power signal into a power to supply the power to the load 320. In the above-described wireless power reception devices 5 to 8 in FIGS. 8 to 11, the resonance coil unit 21a or 21b and the load coil unit 22 may be arranged on the power pickup 312.

The controller 311 transmits control information to the communicator 313 to be described later, and controls an operation point of the power pickup 312. Here, the operation point may include, for example, current or voltage that is output to the load RL, and resonance frequencies of the reception resonance coil L3. The controller 311 may control the power supplied to the load 320.

The communicator 313 transmits control information to the wireless power transmission device. The communicator 313 may transmit the control information through modulation of a reflected load. The control information may include, for example, a target power value that is required in the wireless power reception device, and a reception power value that is transferred to the load of the wireless power reception device. A method for transmitting the control information to the wireless power transmission device will be described with reference to FIG. 13.

Figure 13:
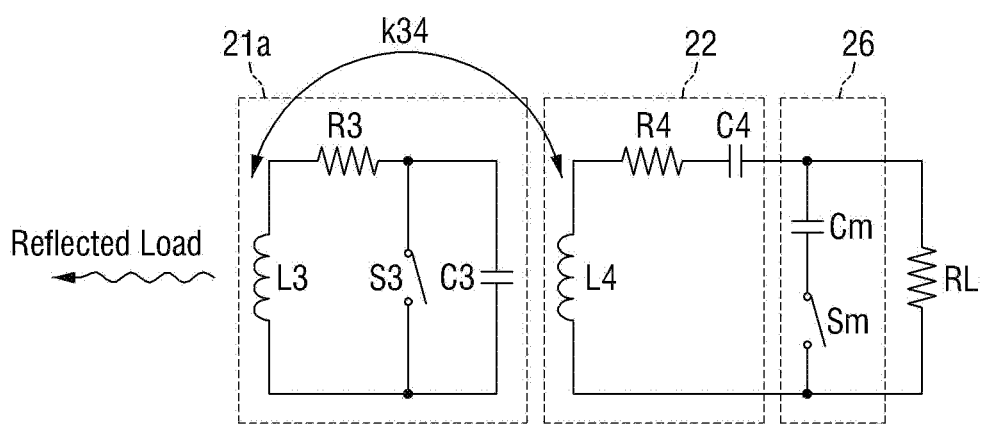
FIG. 13 is a diagram explaining that the wireless power reception device of FIG. 12 transmits control information.

FIG. 13 is a diagram explaining that the wireless power reception device of FIG. 12 transmits control information.

Referring to FIG. 13, a modulator 26 may be installed between a load coil unit 22 of a power pickup 312 and the load RL. The modulator 26 may include a modulation capacitance Cm and a modulator switch Sm.

The modulator 26 may connect the modulation capacitance Cm to the load RL by turning on/off the modulator switch Sm, and may modulate the reflected load by modulating the load RL. The communicator 313 may modulate the reflected load in accordance with the control information received from the controller 311.

The load 320 includes the load RL and a reception power measurement circuit (not illustrated). In the above-described wireless power reception devices 5 to 8 illustrated in FIGS. 8 to 11, the load RL may be arranged on the load 320. The reception power measurement circuit may measure a reception power value that the load RL receives from the load coil L4. The reception power measurement circuit may transmit the measured reception power value to a controller 311 of a receiver 310.

Figure 14:
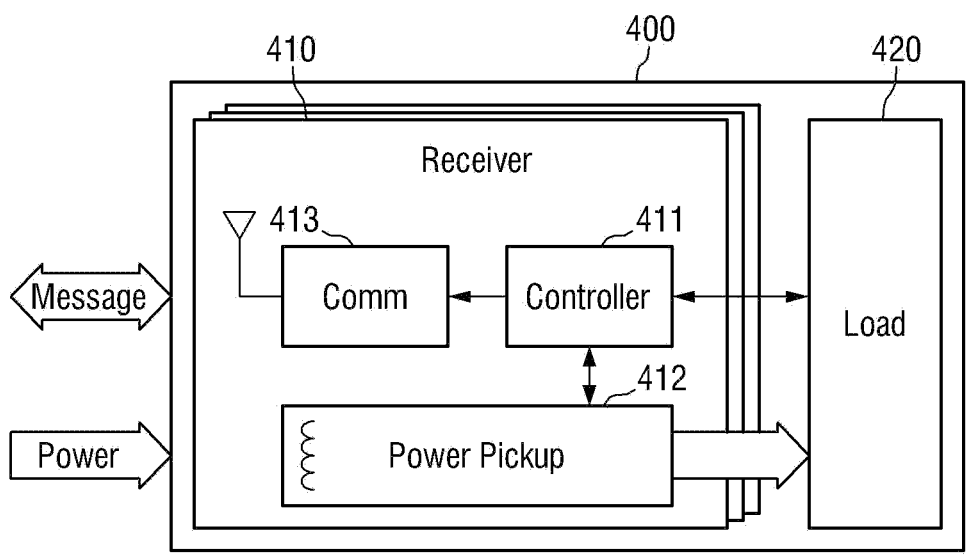
FIG. 14 is a block diagram schematically illustrating the control configuration of a wireless power reception device according to some example embodiments.

FIG. 14 is a block diagram schematically illustrating the control configuration of a wireless power reception device according to some example embodiments. For convenience in explanation, the detailed explanation will be made around the different point from that illustrated in FIG. 12.

Referring to FIG. 14, a wireless power reception device 400 according to some example embodiments includes a receiver 410 and a load 420.

The receiver 410 includes a controller 411, a communicator (Comm) 413, and a power pickup 412.

Referring to FIG. 14, in a wireless power reception device 400 according to some example embodiments, the communicator 413 may form a communication network that is separate from the communicator of the wireless power transmission device, and may transmit and/or receive various kinds of messages. The various kinds of messages may include, for example, a target power value that is required in the wireless power reception device, a reception power value that is transferred to the load of the wireless power reception device, and a transmission type of the wireless power transmission device. Unlike the wireless power reception device illustrated in FIG. 12, the wireless power reception device 400 according to some example embodiments does not use the modulation of the reflected load.

Hereinafter, a power transmission method selectively using an electromagnetic induction type and a magnetic resonance type in a wireless power transmission device according to some example embodiments will be described.

Figure 15:
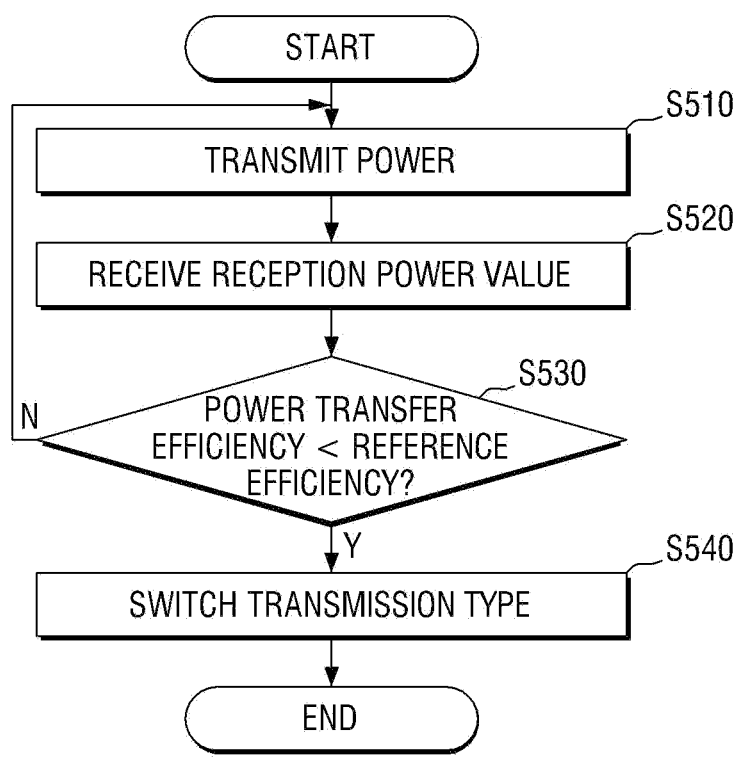
FIG. 15 is a flowchart explaining a power transmission method in an electromagnetic induction type in a wireless power transmission device according to some example embodiments.

FIG. 15 is a flowchart explaining a power transmission method in an electromagnetic induction type in a wireless power transmission device according to some example embodiments.

Referring to FIGS. 5, 7, and 15, a power converter 122 or 222 first transmits a power to a wireless power reception device in an electromagnetic induction type (operation S510). At this time, a transmission resonance coil L2 of the wireless power transmission device is short-circuited or open-circuited as described above according to some example embodiments.

Then, a communicator 123 or 223 receives a reception power value, which is transferred to a load RL, from the wireless power reception device (operation S520). At this time, a transmission power value that is transmitted to the wireless power reception device may be measured. For example, a supplied power measurement circuit may measure the supplied power value that a source voltage Vs supplies to a source coil L1 corresponding to the transmission power value that is transmitted to the wireless power reception device.

Then, a controller 121 or 221 determines whether a power transfer efficiency is lower than a reference efficiency (operation S530). Here, the power transfer efficiency indicates a ratio of the transmission power value to the reception power value.

If the power transfer efficiency is lower than the reference efficiency, the controller 121 or 221 switches the transmission type from the electromagnetic induction type to the magnetic resonance type (operation S540). At this time, a transmission resonance coil L2 of the wireless power transmission device is not short-circuited or is not open-circuited. The communicator 123 or 223 may transmit transmission type switching information to the wireless power reception device.

On the other hand, if the power transfer efficiency is higher than the reference efficiency, the controller 121 or 221 maintains the electromagnetic induction type as the transmission type, and repeats the operation 5510.

Figure 16:
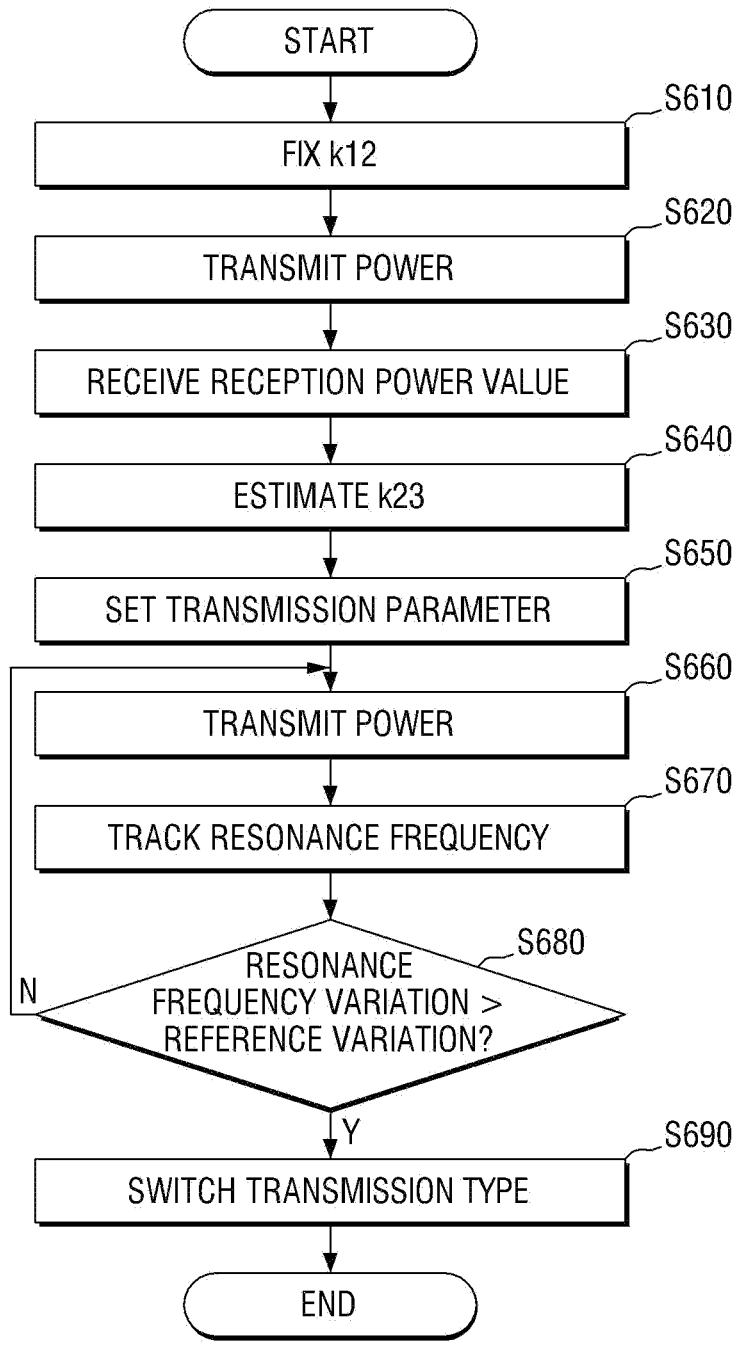
FIG. 16 is a flowchart explaining a power transmission method in a magnetic resonance type in a wireless power transmission device according to some example embodiments.

FIG. 16 is a flowchart explaining a power transmission method in a magnetic resonance type in a wireless power transmission device according to some example embodiments.

Referring to FIGS. 5, 7, and 16, on initial conditions, the controller 121 or 221 fixes "k12" as a reference coupling coefficient (operation S610). Here, "k12" denotes a coupling coefficient of the source coil L1 and the transmission resonance coil L2. In this case, the coupling coefficient between the source coil L1 and the transmission resonance coil L2 may be controlled by, for example, a distance between the source coil L1 and the transmission resonance coil L2, but is not limited thereto.

Then, the power converter 122 or 222 transmits the power to the wireless power reception device in the magnetic resonance type (operation S620). At this time, the transmission resonance coil L2 of the wireless power transmission device is not short-circuited or is not open-circuited as described above according to some example embodiments.

Then, the communicator 123 or 223 receives a reception power value, which is transferred to a reference load, from the wireless power reception device (operation S630). At this time, the load RL may be fixed with the reference load in the wireless power reception device. Further, a transmission power value that is transmitted to the wireless power reception device may be measured. For example, a supplied power measurement circuit may measure the supplied power value that a source voltage Vs supplies to a source coil L1 corresponding to the transmission power value that is transmitted to the wireless power reception device.

Then, a controller 121 or 221 estimates k23 in accordance with the reception power value (operation S640). Here, "k23" denotes the coupling coefficient between the transmission resonance coil L2 of the wireless power transmission device and a reception resonance coil L3 of the wireless power reception device. In this case, the controller 121 or 221 may calculate the power transfer efficiency and estimate k23 that corresponds to the power transfer efficiency. For this, a table on which k23 is mapped according to the power transfer efficiency or a function having k23 as its factor may be stored in the controller 121 or 221.

Then, the controller 121 or 221 sets a transmission parameter according to the estimated k23 (operation S650). Here, the transmission parameter may include, for example, a coupling coefficient k12 between the source coil L1 and the transmission resonance coil L2, a resonance frequency between the transmission resonance coil L2 and a reception resonance coil L3, and a supplied power of the source voltage Vs. In this case, the communicator 123 or 223 may transmit the set transmission parameter to the wireless power reception device.

Then, the power converter 122 or 222 transmits the power to the wireless power reception device in the magnetic resonance type in accordance with the set transmission parameter (operation S660). In this case, the resonance frequency between the transmission resonance coil L2 and the reception resonance coil L3 may be changed depending on the distance between the transmission resonance coil L2 and the reception resonance coil L3 of the wireless power reception device.

Figure 17:
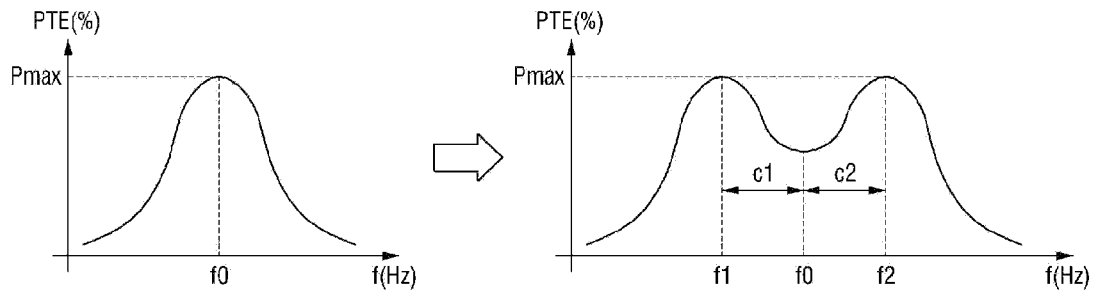
FIG. 17 is a diagram explaining tracking of a resonance frequency in the wireless power transmission method of FIG. 16.

Then, the controller 121 or 221 changes the resonance frequency between the transmission resonance coil L2 and the reception resonance coil L3 in accordance with k23, and tracks the change of the resonance frequency (operation S670). Referring to FIG. 17, as the distance between the transmission resonance coil L2 and the reception resonance coil L3 of the wireless power reception device is changed, the resonance frequency between the transmission resonance coil L2 and the reception resonance coil L3, which achieves the maximum power transmission efficiency (PTE), may be frequency f0 at a first time, or may be changed to plural frequencies f1 and f2 at a second time. At this time, the controller 121 or 221 tracks c1(f0-f1) or c2(f2-f0) as the variation of the resonance frequency.

Then, the controller 121 or 221 determines whether the variation of the resonance frequency is larger than the reference variation (operation S680). In this case, the reference variation may be determined by a function having the coupling coefficient between the source coil L1 and the transmission resonance coil L2 as its factor.

Then, if the variation of the resonance frequency is larger than the reference variation, the controller 121 or 221 switches the transmission type from the magnetic resonance type to the electromagnetic induction type (operation S690). In this case, the transmission resonance coil L2 of the wireless power transmission device is short-circuited or open-circuited as described above according to some example embodiments. On the other hand, if the variation of the resonance frequency is smaller than the reference variation, the controller 121 or 221 maintains the magnetic resonance type as the transmission type, and repeats the operation S660.

Hereinafter, a power reception method selectively using an electromagnetic induction type and a magnetic resonance type in a wireless power reception device according to some example embodiments will be described.

Figure 18:
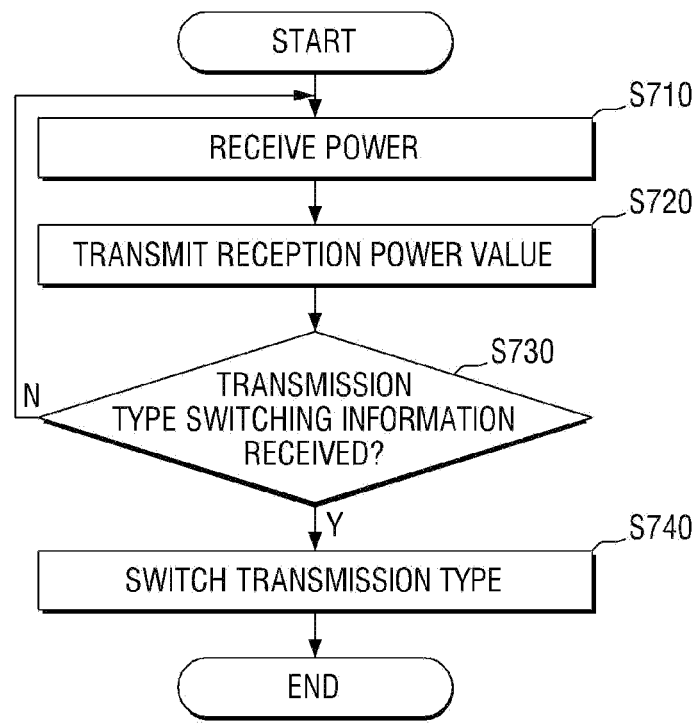
FIG. 18 is a flowchart explaining a power reception method in an electromagnetic induction type in a wireless power reception device according to some example embodiments.

FIG. 18 is a flowchart explaining a power reception method in an electromagnetic induction type in a wireless power reception device according to some example embodiments.

Referring to FIG. 18, a power pickup 312 or 412 first receives a power from a wireless power transmission device in an electromagnetic induction type (operation S710). At this time, a reception resonance coil L3 of the wireless power reception device is short-circuited or open-circuited as described above according to some example embodiments.

Then, a communicator 313 or 413 transmits a reception power value, which is transferred to a load RL, to the wireless power reception device (operation S720). For example, a reception power measurement circuit may measure the reception power value that a load RL receives from a load coil L4.

Then, the communicator 313 or 413 determines whether transmission type switching information is received from the wireless power transmission device (operation S730).

If the transmission type switching information is received, a controller 311 or 411 switches the transmission type from the electromagnetic induction type to the magnetic resonance type (operation S740). At this time, the reception resonance coil L3 of the wireless power reception device is not short-circuited or is not open-circuited as described above according to some example embodiments.

On the other hand, if the transmission type switching information is not received, the controller 311 or 411 repeats the operation S710.

Figure 19:
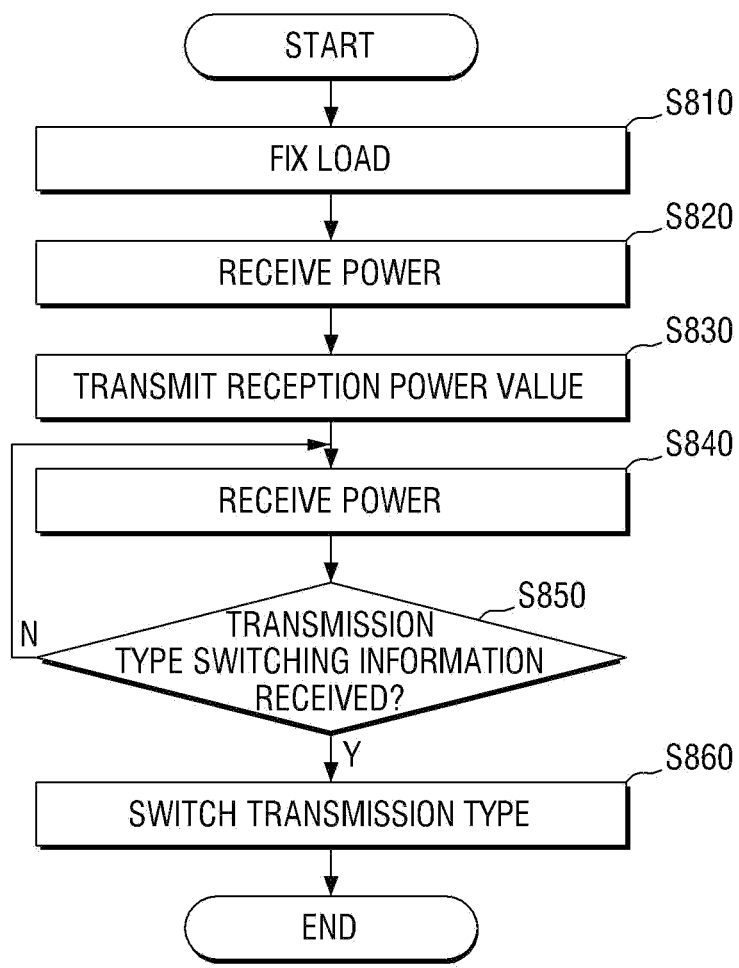
FIG. 19 is a flowchart explaining a power reception method in a magnetic resonance type in a wireless power reception device according to some example embodiments.

FIG. 19 is a flowchart explaining a power transmission method in a magnetic resonance type in a wireless power reception device according to some example embodiments.

Referring to FIG. 19, a load 320 or 420 fixes the load RL as a reference load (operation S810). The load RL of the wireless power reception device may be changed depending on the operations of various kinds of constituent elements of an electronic system including the wireless power reception device and, in this case, the load is fixed with a desired value (that may or may not be predetermined) of the reference load.

Then, the power pickup 312 or 412 receives the power from the wireless power transmission device in the magnetic resonance type (operation S820). At this time, the reception resonance coil L3 of the wireless power reception device is not short-circuited or is not open-circuited as described above according to some example embodiments.

Then, the communicator 313 or 413 transmits the reception power value, which is transferred to the reference load, to the wireless power reception device (operation S830). For example, the reception power measurement circuit may measure the reception power value that the reference load receives from the load coil L4.

Then, the power pickup 312 or 412 receives the power from the wireless power transmission device in the magnetic resonance type (operation S840). At this time, the controller 121 or 221 of the wireless power transmission device may estimate k23, and set a transmission parameter according to the estimated k23 to transmit the power. If necessary, the communicator 313 or 413 may receive the set transmission parameter information from the wireless power transmission device, and the controller 311 or 411 may set the transmission parameter of the wireless power reception device according to the received information.

Then, the communicator 313 or 413 determines whether the transmission type switching information is received from the wireless power transmission device (operation S850).

If the transmission type switching information is received, the controller 311 or 411 switches the transmission type from the magnetic resonance type to the electromagnetic induction type (operation S860). At this time, the reception resonance coil L3 of the wireless power reception device is short-circuited or open-circuited as described above according to some example embodiments.

On the other hand, if the transmission type switching information is not received, the controller 311 or 411 repeats the operation S840.

Figure 20:
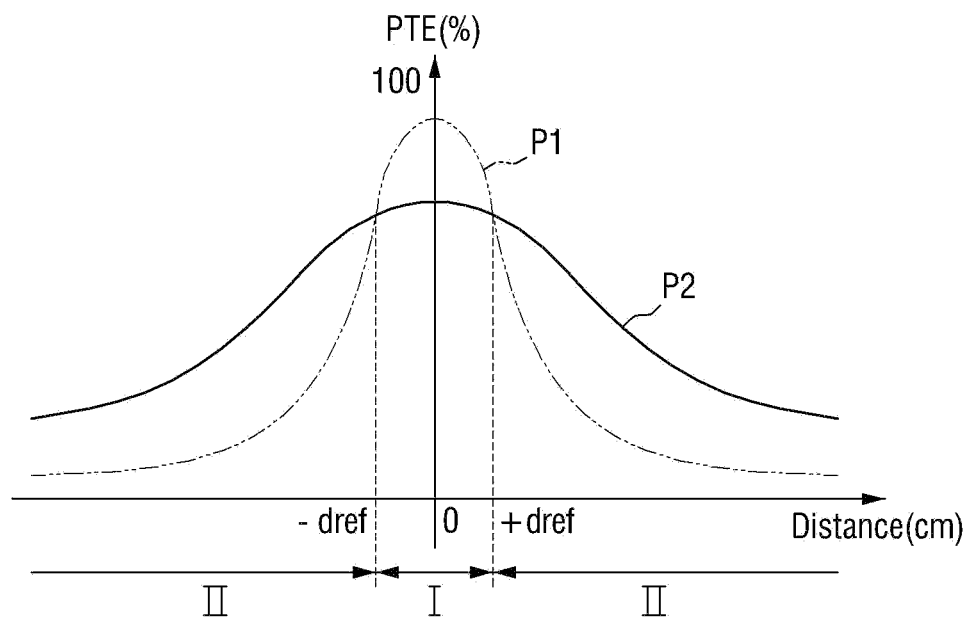
FIG. 20 is a diagram explaining a power efficiency of a wireless power transmission system according to some example embodiments.

FIG. 20 is a diagram explaining a power efficiency of a wireless power transmission system according to some example embodiments.

Referring to FIG. 20, if the wireless power transmission type is the electromagnetic induction type, and the source coil of the wireless power transmission device and the load coil of the wireless power reception device have good alignment, the power transfer efficiency becomes high. However, if the alignment of the source coil and the load coil is not good, or the source coil and the load coil are separated from each other, the power transfer efficiency is abruptly reduced. In FIG. 20, P1 denotes the electromagnetic induction type power transfer efficiency.

The magnetic resonance type shows a relatively higher power transfer efficiency than the electromagnetic induction type even though the distance between the transmission resonance coil and the reception resonance coil is long. However, if the distance between the transmission resonance coil and the reception resonance coil is short, the magnetic resonance type shows a relatively lower power transfer efficiency than the electromagnetic induction type. In FIG. 20, P2 denotes the magnetic resonance type power transfer efficiency.

According to the wireless power transmission devices 1 to 4 and/or the wireless power reception devices 5 to 8 according to some example embodiments, the power is transmitted in the electromagnetic induction type if the distance between the wireless power transmission device and the wireless power reception device is shorter than the reference distance dref and the coil alignment is good (I), while the power is transmitted in the magnetic resonance type if the distance between the wireless power transmission device and the wireless power reception device is longer than the reference distance dref or the coil alignment is not good (II).

Hereinafter, an electronic system including a wireless power transmission device and a wireless power reception device according to some example embodiments will be described.

Figure 21:
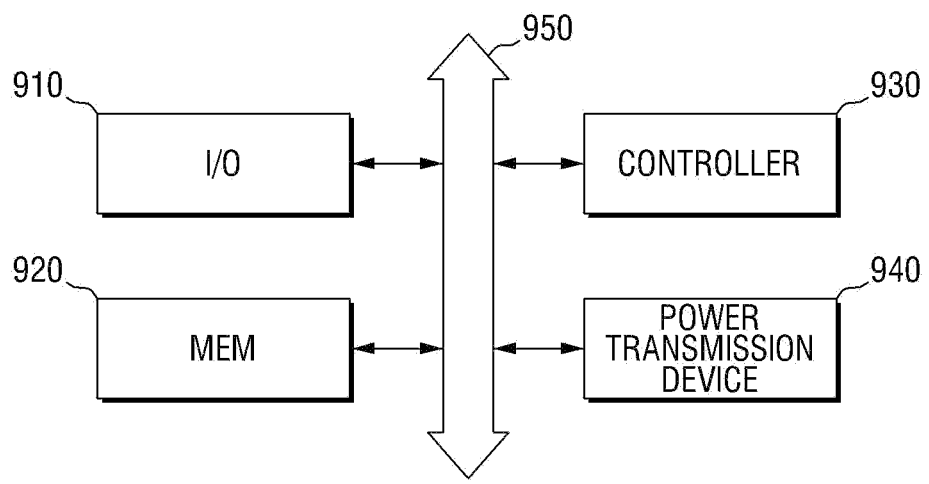
FIG. 21 is a block diagram schematically illustrating the configuration of an electronic system including a wireless power transmission device according to some example embodiments.

FIG. 21 is a block diagram schematically illustrating the configuration of an electronic system including a wireless power transmission device according to some example embodiments.

Referring to FIG. 21, an electronic system 9 may include a controller 930, an input/output (I/O) device 910, a memory 920, a power transmission device 940, and a bus 950. The controller 930, the I/O device 910, the power transmission device 940, and/or the memory 920 may be coupled to one another through the bus 950. The bus 950 corresponds to paths through which data is transferred.

The controller 930 may include at least one of a microprocessor, a digital signal processor, a microcontroller, and logic elements that can perform similar functions. The I/O device 910 may include a keypad, a keyboard, and a display device. The memory 920 may store data and/or commands. The power transmission device 940 may transmit the power to the outside. Although not illustrated, the electronic system 9 may further include a high-speed Dynamic Random Access Memory (DRAM) and/or Static Random Access Memory (SRAM) as an operating memory for improving the operation of the controller 930.

The wireless power transmission devices 1 to 4 according to some example embodiments may be provided as a part of the power transmission device 940.

Figure 22:
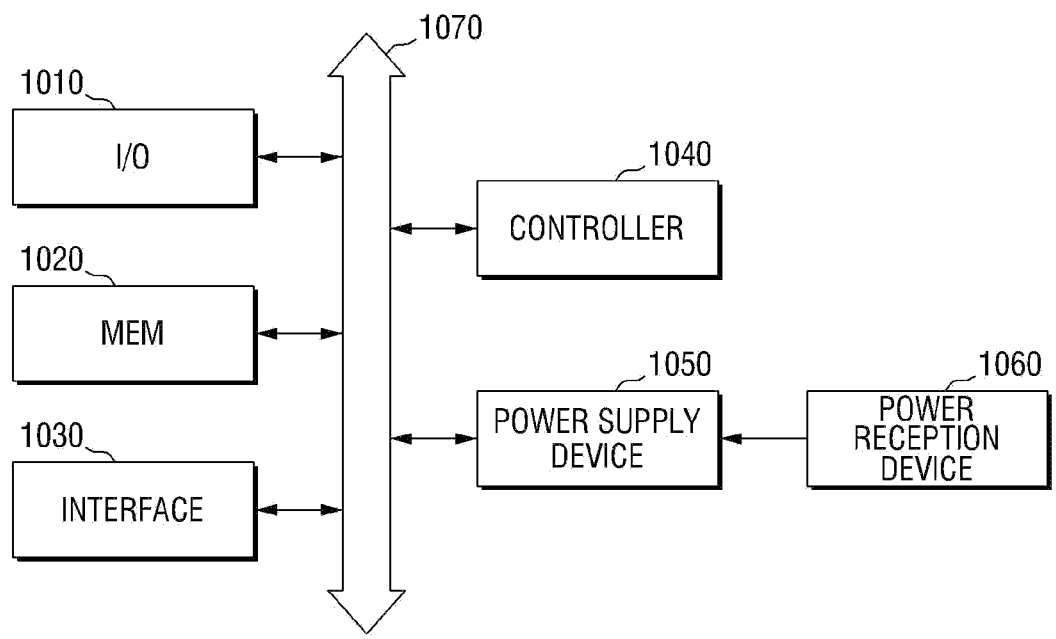
FIG. 22 is a block diagram schematically illustrating the configuration of an electronic system including a wireless power reception device according to some example embodiments.

FIG. 22 is a block diagram schematically illustrating the configuration of an electronic system including a wireless power reception device according to some example embodiments.

Referring to FIG. 22, an electronic system 10 may include a controller 1040, an input/output (I/O) device 1010, a memory 1020, an interface 1030, a power supply device 1050, a power reception device 1060, and a bus 1070. The controller 1040, the I/O device 1010, the memory 1020, the interface 1030, and/or the power supply device 1050 may be coupled to one another through the bus 1070. The bus 1070 corresponds to paths through which data is transferred.

The controller 1040 may include at least one of a microprocessor, a digital signal processor, a microcontroller, and logic elements that can perform similar functions. The I/O device 1010 may include a keypad, a keyboard, and a display device. The memory 1020 may store data and/or commands. The interface 1030 may function to transmit data to a communication network or to receive data from the communication network. The interface 1030 may be of a wired or wireless type. For example, the interface 1030 may include an antenna or a wire/wireless transceiver. The power supply device 1050 may supply the power to the controller 1040, the I/O device 1010, the memory 1020, and the interface 1030. The power supply device 1050 may include, for example, a battery. The power reception device 1060 may receive the wireless power from the outside and may transmit the wireless power to the power supply device 1050. Although not illustrated, the electronic system 10 may further include a high-speed DRAM and/or SRAM as an operating memory for improving the operation of the controller 1040.

The wireless power reception devices 5 to 8 according to some example embodiments may be provided as a part of the power reception device 1060.

The electronic system 10 may be applied to a PDA (Personal Digital Assistant), a portable computer, a web tablet, a wireless phone, a mobile phone, a digital music player, a memory card, or all electronic devices that can transmit and/or receive information in wireless environments.

Figure 23:
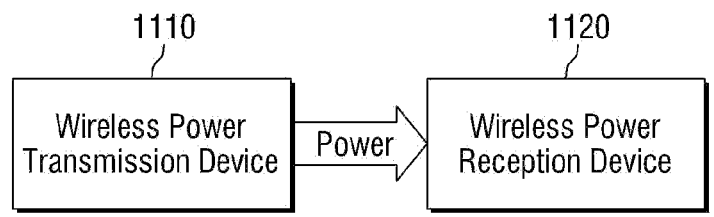
FIG. 23 is a block diagram explaining a wireless power transmission system according to some example embodiment.

FIG. 23 is a block diagram explaining a wireless power transmission system according to some example embodiments.

Referring to FIG. 23, a wireless power transmission system 11 according to some example embodiments includes a wireless power transmission device 1110 and a wireless power reception device 1120.

The wireless power transmission device 1110 may be provided with constituent elements of the wireless power transmission devices of FIGS. 1 to 4. Further, the wireless power transmission device 1110 may be provided with a source voltage, a source coil, and a parasitic resistance and a parasitic capacitance of the source coil.

The wireless power reception device 1120 may be provided with constituent elements of the wireless power reception devices of FIGS. 8 to 11. Further, the wireless power reception device 1120 may be provided with a load, a load coil, and a parasitic resistance and a parasitic capacitance of the load coil.

The wireless power transmission system 11 according to some example embodiments may include a 3-coil system or a 4-coil system. Exemplarily, the 3-coil system may be a system in which either of a transmission resonance coil and a reception resonance coil exists, and only one of a wireless power transmission device 1110 and a wireless power reception device 1120 can switch the operation type. Exemplarily, the 4-coil system may be a system in which both the transmission resonance coil and the reception resonance coil exist, and both the wireless power transmission device 1110 and the wireless power reception device 1120 can switch the operation type.

Figure 24:
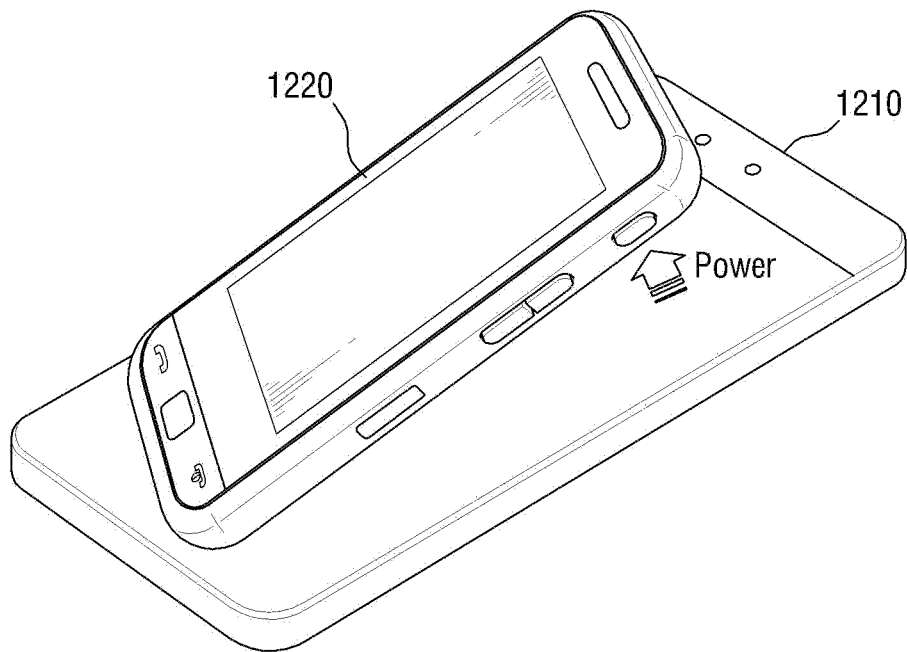
FIG. 24 is a conceptual diagram explaining transmission and reception of a power through a wireless power transmission system according to some example embodiments.

FIG. 24 is a conceptual diagram explaining transmission and reception of a power through a wireless power transmission system according to some example embodiments.

In a wireless power transmission system according to some example embodiments, a wireless power transmission device 1210 may transmit power to a wireless power reception device 1220 in a non-contact manner. As the wireless power reception device, the reference numeral "1220" denotes a mobile phone. However, the wireless power reception device is not limited thereto, but may be applied to a tablet personal computer (PC) and a notebook computer. It is apparent to those of skilled in the art that the wireless power reception device in the wireless power transmission system according to some example embodiments can be applied to other non-exemplified integrated circuit devices.

While example embodiments have been particularly shown and described, it will be understood by those of ordinary skill in the art that various changes in form and details may be made therein without departing from the spirit and scope of the present invention as defined by the following claims.

What is claimed is:

1. A wireless power transmission device, comprising:
a source coil; and
a resonance coil inductively coupled to the source coil;
wherein the source coil transmits power outside of the wireless power transmission device in an electromagnetic induction type during a first interval, and
wherein the source coil transmits the power to the resonance coil in the electromagnetic induction type and the resonance coil transmits the power received from the source coil to the outside of the wireless power transmission device in a magnetic resonance type during a second interval that is different from the first interval.

2. The wireless power transmission device of claim 1, wherein the resonance coil is short-circuited during the first interval, and
wherein the resonance coil is not short-circuited during the second interval that is different from the first interval.

3. The wireless power transmission device of claim 1, wherein the resonance coil is open-circuited during the first interval, and
wherein the resonance coil is not open-circuited during the second interval that is different from the first interval.

4. A wireless power transmission device, comprising:
a source coil transmitting power in an electromagnetic induction type;
a resonance coil inductively coupled to the source coil and transmitting the power in a magnetic resonance type; and
a switch connected in parallel with the resonance coil;
wherein the switch is in an ON state and the resonance coil does not receive the power from the source coil during a first interval, and
wherein the switch is in an OFF state and the resonance coil receives the power from the source coil during a second interval that is different from the first interval.

5. The wireless power transmission device of claim 4, wherein the source coil transmits the power outside of the wireless power transmission device in the electromagnetic induction type during the first interval, and
wherein the resonance coil transmits the power received from the source coil to the outside of the wireless power transmission device in the magnetic resonance type during the second interval that is different from the first interval.

6. The wireless power transmission device of claim 4, wherein the resonance coil is short-circuited during the first interval, and
wherein the resonance coil is not short-circuited during the second interval that is different from the first interval.

7. A wireless power transmission device, comprising:
a source coil transmitting power in an electromagnetic induction type;
a resonance coil inductively coupled to the source coil to transmit the power in a magnetic resonance type; and
a switch connected in series with the resonance coil;
wherein the switch is in an OFF state and the resonance coil does not receive the power from the source coil during a first interval, and
wherein the switch is in an ON state and the resonance coil receives the power from the source coil during a second interval that is different from the first interval.

8. The wireless power transmission device of claim 7, wherein the source coil transmits the power outside of the wireless power transmission device in the electromagnetic induction type during the first interval, and
wherein the resonance coil transmits the power received from the source coil to the outside of the wireless power transmission device in the magnetic resonance type during the second interval that is different from the first interval.

9. The wireless power transmission device of claim 7, wherein the resonance coil is open-circuited during the first interval, and
wherein the resonance coil is not open-circuited during the second interval that is different from the first interval.

10. A wireless power reception device, comprising:
a load coil; and
a resonance coil inductively coupled to the load coil;

wherein the load coil receives power from an outside of the wireless power transmission device in an electromagnetic induction type during a first interval, and wherein the resonance coil receives the power from the outside of the wireless power transmission device in a magnetic resonance type and the load coil receives the power from the resonance coil in the electromagnetic induction type during a second interval that is different from the first interval.

11. The wireless power reception device of claim 10, wherein the resonance coil is short-circuited during the first interval, and wherein the resonance coil is not short-circuited during the second interval that is different from the first interval.

12. The wireless power reception device of claim 10, wherein the resonance coil is open-circuited during the first interval, and wherein the resonance coil is not open-circuited during the second interval that is different from the first interval.

13. A wireless power transmission system, comprising:
a wireless power transmission device transmitting power; and
a wireless power reception device including a load coil to receive the power from the wireless power transmission device;
wherein the wireless power transmission device includes a source coil and a transmission resonance coil inductively coupled to the source coil,
wherein the source coil transmits the power to the load coil in an electromagnetic induction type during a first interval, and
wherein the source coil transmits the power to the transmission resonance coil in the electromagnetic induction type and the transmission resonance coil transmits the power received from the source coil to the load coil in a magnetic resonance type during a second interval that is different from the first interval.

14. A wireless power transmission method, comprising:
transmitting power to a wireless power reception device in an electromagnetic induction type using a source coil; and
transmitting the power to the wireless power reception device in a magnetic resonance type using a transmission resonance coil inductively coupled to the source coil.

15. The wireless power transmission method of claim 14, wherein the transmitting the power in the electromagnetic induction type includes making the transmission resonance coil short-circuited, and
wherein the transmitting the power in the magnetic resonance type includes making the transmission resonance coil not short-circuited.

16. The wireless power transmission method of claim 14, wherein the transmitting the power in the electromagnetic induction type includes making the transmission resonance coil open-circuited, and
wherein the transmitting the power in the magnetic resonance type includes making the transmission resonance coil not open-circuited.

17. The wireless power transmission method of claim 14, wherein the transmitting the power in the electromagnetic induction type comprises receiving a reception power value, which a load of the wireless power reception device receives, from the wireless power reception device.

18. The wireless power transmission method of claim 17, wherein the transmitting the power in the electromagnetic induction type further comprises measuring a transmission power value that is transmitted to the wireless power reception device.

19. The wireless power transmission method of claim 18, wherein the transmitting the power in the electromagnetic induction type further comprises switching a power transmission type to the magnetic resonance type if a power transfer efficiency according to the transmission power value and the reception power value is lower than a reference efficiency.

20. The wireless power transmission method of claim 14, wherein the transmitting the power in the magnetic resonance type comprises changing a resonance frequency of the transmission resonance coil and a reception resonance coil according to a coupling coefficient of the transmission resonance coil and the reception resonance coil of the wireless power reception device.

21. The wireless power transmission method of claim 20, wherein the transmitting the power in the magnetic resonance type further comprises tracking the change of the resonance frequency of the transmission resonance coil and the reception resonance coil.

22. The wireless power transmission method of claim 21, wherein the transmitting the power in the magnetic resonance type further comprises switching a power transmission type to the electromagnetic induction type if a variation of the resonance frequency of the transmission resonance coil is larger than a reference variation.

23. The wireless power transmission method of claim 14, wherein the transmitting the power in the magnetic resonance type comprises fixing a coupling coefficient of the source coil and the transmission resonance coil to a reference coupling coefficient on initial conditions.

24. The wireless power transmission method of claim 23, wherein the transmitting the power in the magnetic resonance type further comprises receiving a reception power value, which a reference load of the wireless power reception device receives, from the wireless power reception device.

25. The wireless power transmission method of claim 24, wherein the transmitting the power in the magnetic resonance type further comprises estimating a coupling coefficient of the transmission resonance coil and a reception resonance coil of the wireless power reception device according to the reception power value.

26. A wireless power system, comprising:
a wireless power transmission device; and
a wireless power reception device;
wherein the wireless power transmission device is configured to transmit power to the wireless power reception device in an electromagnetic induction type during a first interval, and
wherein the wireless power transmission device is further configured to transmit power to the wireless power reception device in a magnetic resonance type during a second interval that is different from the first interval.

27. The wireless power system of claim 26, wherein the wireless power transmission device comprises:
a source coil; and
a first resonance coil inductively coupled to the source coil.

28. The wireless power system of claim 27, further comprising a first switch in parallel with the first resonance coil;
wherein the first switch is configured to selectively short-circuit the first resonance coil.

29. The wireless power system of claim 27, further comprising a second switch in series with the first resonance coil;
wherein the second switch is configured to selectively open-circuit the first resonance coil.

30. The wireless power system of claim 26, wherein the wireless power reception device comprises:
  a load coil; and
  a second resonance coil inductively coupled to the load coil.

31. The wireless power system of claim 30, further comprising a third switch in parallel with the second resonance coil;
  wherein the third switch is configured to selectively short-circuit the second resonance coil.

32. The wireless power system of claim 30, further comprising a fourth switch in series with the second resonance coil;
  wherein the fourth switch is configured to selectively open-circuit the second resonance coil.

* * * * *